United States Patent
Bessis et al.

(10) Patent No.: US 8,955,090 B2
(45) Date of Patent: Feb. 10, 2015

(54) SESSION INITIATION PROTOCOL (SIP) FIREWALL FOR IP MULTIMEDIA SUBSYSTEM (IMS) CORE

(75) Inventors: Thierry C. Bessis, Naperville, IL (US); Ashwin V. Rana, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 379 days.

(21) Appl. No.: 12/987,554

(22) Filed: Jan. 10, 2011

(65) Prior Publication Data
US 2012/0180119 A1 Jul. 12, 2012

(51) Int. Cl.
*G06F 21/00* (2013.01)
*H04L 29/06* (2006.01)
*H04L 9/32* (2006.01)

(52) U.S. Cl.
CPC .......... *H04L 63/0281* (2013.01); *H04L 9/3271* (2013.01); *H04L 63/1458* (2013.01)
USPC ................. 726/11; 726/12; 726/13; 726/14; 726/22; 726/23; 709/220; 709/223; 709/224; 709/225

(58) Field of Classification Search
CPC ............ H04L 65/1006; H04L 63/1458; H04L 65/1016; H04L 63/1416; H04L 65/1073; H04L 9/3271; H04L 63/0281
USPC ........... 726/11–14, 22–23; 709/220, 223–225
See application file for complete search history.

(56) References Cited

U.S. PATENT DOCUMENTS

| 7,568,224 | B1 * | 7/2009 | Jennings et al. ................ 726/14 |
| 7,653,938 | B1 * | 1/2010 | Touitou et al. ................ 726/14 |
| 8,250,634 | B2 * | 8/2012 | Agarwal et al. ................ 726/5 |
| 8,279,860 | B1 * | 10/2012 | Nucci et al. ................ 370/356 |
| 2005/0226174 | A1 * | 10/2005 | Kiss ................ 370/282 |
| 2006/0098624 | A1 * | 5/2006 | Morgan et al. ................ 370/352 |

(Continued)

FOREIGN PATENT DOCUMENTS

| EP | 1965558 | * | 9/2008 | ............. H04L 29/06 |
| EP | 1965558 | A1 | 9/2008 | |

(Continued)

OTHER PUBLICATIONS

Xianglin Deng, Chien-Wei Lee: "Security of VoIP—SIP Flooding and its Mitigation", XP-002671411, Apr. 2008, pp. 1-4, Christchurch, New Zealand.

*Primary Examiner* — Catherine Thiaw
(74) *Attorney, Agent, or Firm* — Ryan, Mason & Lewis, LLP

(57) ABSTRACT

A SIP firewall defends an IMS network against SIP registration-based DoS/DDoS attacks by issuing fake authentication challenges when suspiciously high registration traffic is present. The fake authentication challenges include a predictive nonce that is to be used in the challenge response, thus forcing users to be state-aware and to issue the SIP registration requests from valid IP address in order to successfully respond to the fake authentication challenges. Upon confirming an association between the challenge response and the fake authentication challenges, the firewall opens a registration window to a protected node of the core network. In such manner, the firewall opens a registration window to (unauthenticated) legitimate users while stopping DDoS mode of registrations (or at least making them extremely difficult and costly) without impacting or involving the protected node.

21 Claims, 2 Drawing Sheets

(56) References Cited

U.S. PATENT DOCUMENTS

| | | | |
|---|---|---|---|
| 2007/0118894 A1* | 5/2007 | Bhatia | 726/13 |
| 2007/0300304 A1* | 12/2007 | Lindgren | 726/24 |
| 2008/0089494 A1* | 4/2008 | Kaas et al. | 379/93.02 |
| 2008/0092224 A1* | 4/2008 | Coulas et al. | 726/12 |
| 2008/0222724 A1* | 9/2008 | Ormazabal et al. | 726/23 |
| 2008/0263661 A1* | 10/2008 | Bouzida | 726/22 |
| 2009/0006841 A1* | 1/2009 | Ormazabal et al. | 713/152 |
| 2009/0245233 A1* | 10/2009 | Prasad et al. | 370/352 |
| 2009/0288165 A1* | 11/2009 | Qiu et al. | 726/23 |
| 2009/0293123 A1* | 11/2009 | Jackson et al. | 726/23 |
| 2009/0310484 A1* | 12/2009 | Sisalem et al. | 370/230 |
| 2010/0154057 A1* | 6/2010 | Ko et al. | 726/23 |
| 2011/0138462 A1* | 6/2011 | Kim et al. | 726/22 |
| 2011/0162060 A1* | 6/2011 | Vijayakumar et al. | 726/13 |
| 2012/0174217 A1* | 7/2012 | Ormazabal | 726/22 |

FOREIGN PATENT DOCUMENTS

| | | | |
|---|---|---|---|
| EP | 2109284 | * 10/2009 | H04L 29/06 |
| EP | 2109284 A1 | 10/2009 | |
| WO | 2004/006115 A1 | 1/2012 | |

* cited by examiner

SESSION INITIATION PROTOCOL (SIP) FIREWALL FOR IP MULTIMEDIA SUBSYSTEM (IMS) CORE

FIELD OF THE INVENTION

This invention relates generally to communication systems and, more particularly, to a firewall for protecting IMS networks against SIP-based attacks.

BACKGROUND OF THE INVENTION

One type of communication network gaining popularity is an IP Multimedia Subsystem (IMS) network. As set forth in the $3^{rd}$ Generation Partnership Project (3GPP) or 3GPP2, IMS provides a common core network having access-agnostic network architecture for converged networks. Service providers are using this architecture in next-generation network evolution to provide multimedia services to mobile users (and also fixed access users). IMS uses IP (Internet Protocol), and more specifically uses Session Initiation Protocol (SIP) as the call control protocol. As the deployments of IMS networks proliferate, there is a need to secure the IMS infrastructure ("IMS core") against SIP-based attacks. One way to do so is through a SIP firewall, which is loosely defined as a device that blocks attacks mounted through SIP messages.

The most difficult attacks that the SIP firewall must deal with are Distributed Denial of Service (DDoS) attacks, consisting for example in massively flooding the SIP firewall with correctly formatted and SIP-compliant registration requests coming from a very large number of sources in attempt to overload the network. The access border is the most vulnerable because the access network can be partly or fully public, and the number of fixed or mobile users connecting to the access border can be extremely large, which makes "per subscriber" security rules impractical. To complicate the matter, subscribers (or hackers) can connect via SIP proxies, or from a PBX, making IP source-based rejection rules ineffective. Advantageously, the firewall should stop the flooding to protect the next node (called a protected node) but on the other hand, the firewall must not close the door to initial registrations from legitimate users, otherwise the DDoS attack will have succeeded. It is a complex problem because in an IMS network, the firewall has no way to distinguish between "good" registrations (i.e., from legitimate users) and "bad" registrations (i.e., associated with a DDoS attack) since only the next protected node can perform authentication.

SUMMARY OF THE INVENTION

This problem is addressed and an advance is made in the art by a firewall (in one example, a SIP firewall) executing an algorithm to defend against a DDoS attack: the firewall is adapted to allow (unauthenticated) registrations from legitimate users while stopping DDoS mode of registrations (or at least making them extremely difficult and costly) without impacting or involving the protected node.

In one embodiment, there is provided a method implemented by a firewall residing between an access network and a core network. The firewall monitors registration message traffic relative to one or more thresholds (e.g., without limitation, an overload threshold and a registration failure threshold), the registration message traffic including registration requests issued from a plurality of user devices attempting to gain access to the core network. Responsive to the registration message traffic exceeding any of the one or more thresholds, the firewall challenges a number of the registration requests with fake authentication challenges; and receives a number of challenge responses responsive to the fake authentication challenges. The firewall confirms an association between the challenge responses and the corresponding fake authentication challenges for one or more of the user devices; and opens a registration window to the core network from the one or more user devices having a confirmed association between the challenge response and the corresponding fake authentication challenge.

In another embodiment, there is provided a firewall apparatus adapted for operation between an access network and a core network. The firewall comprises a memory and at least one processor coupled to the memory. The processor is configured to monitor registration message traffic relative to one or more thresholds (e.g., without limitation, an overload threshold and a registration failure threshold), the registration message traffic including registration requests issued from a plurality of user devices attempting to gain access to the core network. Responsive to the registration message traffic exceeding any of the one or more thresholds, the processor challenges a number of the registration requests with fake authentication challenges; and receives a number of challenge responses responsive to the fake authentication challenges. The processor is further configured to confirm an association between the challenge responses and the corresponding fake authentication challenges; and open a registration window to the core network from the one or more user devices having a confirmed association between the challenge responses and the corresponding fake authentication challenges.

In still another embodiment, there is provided a method implemented by a SIP firewall residing between an access network and an IMS core network. The SIP firewall monitors SIP registration message traffic relative to one or more thresholds (e.g., without limitation, an overload threshold and a registration failure threshold), the SIP registration message traffic nominally including first and second SIP registration requests from each of one or more user devices attempting to gain access to the IMS core network. Responsive to the SIP registration message traffic exceeding either of the one or more thresholds, the SIP firewall challenges a number of the first SIP registration requests with fake authentication challenges; and receives one or more second SIP registration requests responsive to the fake authentication challenges. The SIP firewall verifies a stateful mode and valid IP address of one or more user devices by confirming an association between the second SIP registration requests and the corresponding fake authentication challenges; and opens a registration window to the core network from the one or more user devices having a verified stateful mode and valid IP address.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
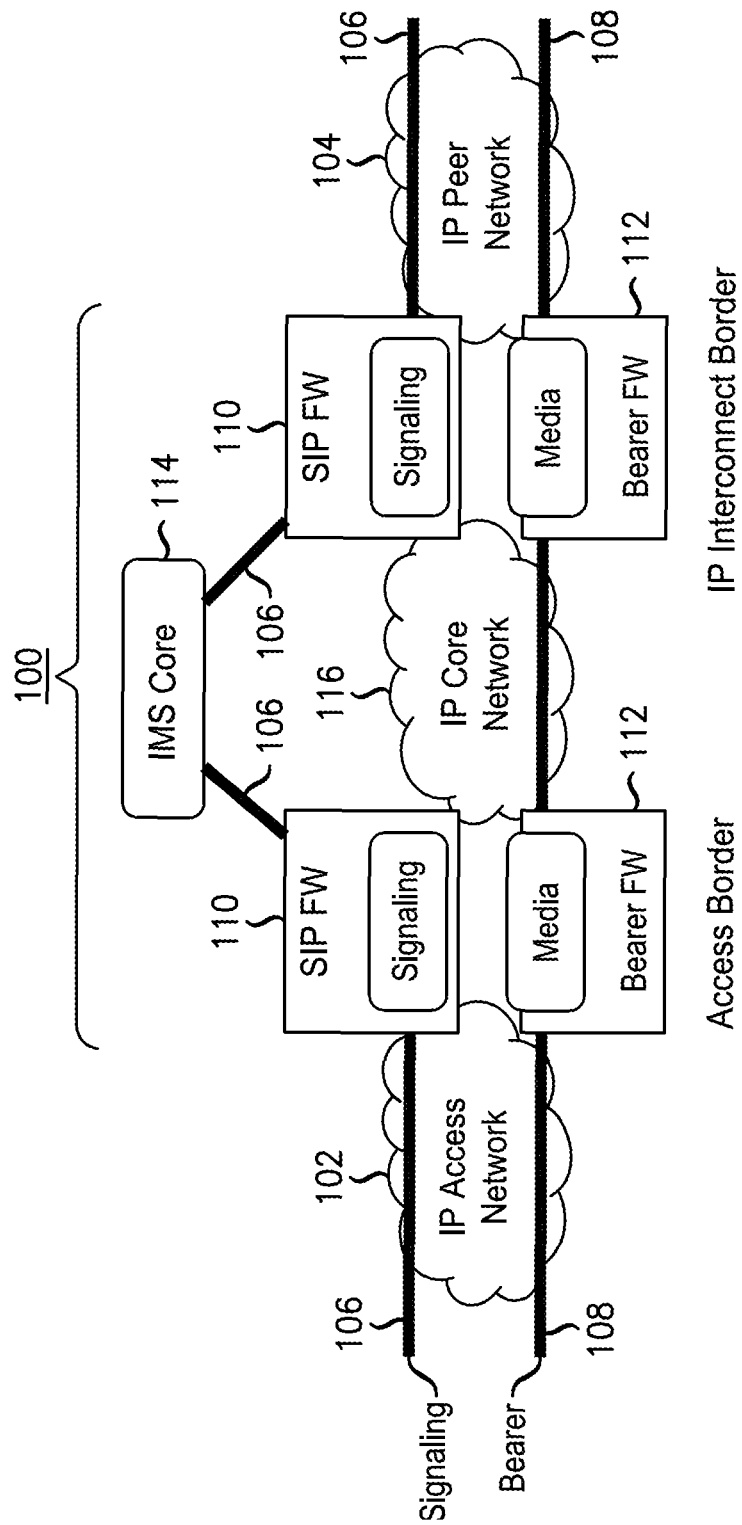
FIG. 1 illustrates an IMS network including SIP firewalls in an exemplary embodiment of the invention.

FIG. 1 illustrates an IMS network 100 residing between an IP access network 102 and IP peer network 104. The access network 102 is where the IMS mobile (or fixed) users connect to the IMS core: they register, setup SIP sessions and answer SIP session requests. The IMS users (not shown) may characterize legitimate users or attackers; and they may connect directly via user equipment (UE), via SIP proxies (aggregating traffic from multiple users) or from a PBX. The edge of the IMS network bordering the access network is termed an "access border." The peer network 104 represents the peering connectivity of the IMS network 100 to any other IMS core network, or by extension to any Application Server that would not be trusted as an IMS core insider. The edge of the IMS network 100 bordering the IP peer network is termed an "IP interconnect border."

Generally, message traffic between and among the IMS network, access network and peer network may be characterized in either of two functional planes: a control plane 106 for signaling traffic and a bearer plane 108 for bearer traffic, such as multimedia content. At the edges of the IMS network, SIP firewalls 110 are used for signaling control (i.e., on the control plane 106) and bearer firewalls 112 are used for media control (i.e., on the bearer plane 108). The portion of the IMS network protected by the SIP firewalls is referred to as the IMS Core 114; and the portion of the network for communicating bearer traffic is referred to as the IP Core Network 116. Often, the SIP firewalls 110 and bearer firewalls 112 reside in the same physical structure, termed a Session Border Controller (SBC). Hereinafter, reference to SIP firewalls 110 will be understood to encompass any implementation of SIP firewall, whether implemented in a stand-alone device or integrated with a bearer firewall (e.g., in an SBC) or any other component.

The IMS Core 114 includes one or more protected nodes (not shown) comprising any system, server, application or function adapted to serve a call in an IMS network. The protected nodes may include, among other elements, a call session control function (CSCF), proxy CSCP (P-CSCF), or Home Subscriber Server (HSS) for performing actions such as processing SIP registrations, SIP session requests and authenticating users. As will be appreciated, the protected nodes are functional elements that may reside in one or more physical devices or structures, and can physically reside in the SIP firewall 110 or in the IMS Core 114.

A primary purpose of the SIP firewall 110 is to defend protected nodes from Denial-of-Service (DoS) or Distributed DoS (DDoS) attacks so that the protected nodes have enough resources to process the nominal load. DDoS attacks are important in SIP because anomalous messages can be sent at a high rate so as to overwhelm the SIP firewall and render it unable to analyze the incoming message load. In order to separate the anomalous messages from the normal ones, the SIP firewall should be capable of analyzing the SIP message for various syntactical checks: the length field matches the actual byte count, each message appears in sequence, is syntactically correct, etc. The irony is that the more the SIP firewall analyzes the SIP messages to stop more sophisticated attacks, the more resources it uses and therefore the more vulnerable it becomes to DoS attacks. The real challenge is that this must be done not only at a very high speed to cope with the high traffic arrival rate of legitimate requests, but also at a low cost.

In one embodiment, this is accomplished by a hardware-based, specialized CPU implementation to accommodate a representative load on the order of Gigabits or more that may arrive at the access border. In one example, the SIP firewall employs a Cavium Octeon processor, coded in C and C++. The Cavium Octeon family of processors is a scalable, high-performance and low-power solution for intelligent networking applications ranging from 100 Mbps to 40 Gbps. These software-compatible processors integrate next-generation networking I/Os along with advanced security, storage and application hardware acceleration, offering very high throughput and good programmability. This product is approaching the phenomenal processing capacity of 350,000 SIP messages per second per CPU, which is more than enough to filter several one or two gigabits links simultaneously and in real time. However, as will be appreciated, the SIP firewalls may be implemented in alternative modalities, with alternative processor components, and may be sized to accommodate smaller or greater processing capacity. The SIP firewalls may be integrated in the same physical device or distributed among multiple devices.

According to principles of the present invention, the SIP firewall 110 is augmented with the capability to defend against SIP registration DoS/DDoS attacks. Before users are registered they are considered untrusted, i.e., registration messages arrive from unknown origin IP addresses and/or unknown SIP identities (e.g., Private User Identity (PUID)). However, recall that the SIP firewall must allow registration requests from users that are initially untrusted because that is the only way legitimate users can become trusted and obtain services from the IMS network. This is also the "weakest point" in which an attacker may flood the SIP firewall with initial registrations.

Figure 2:
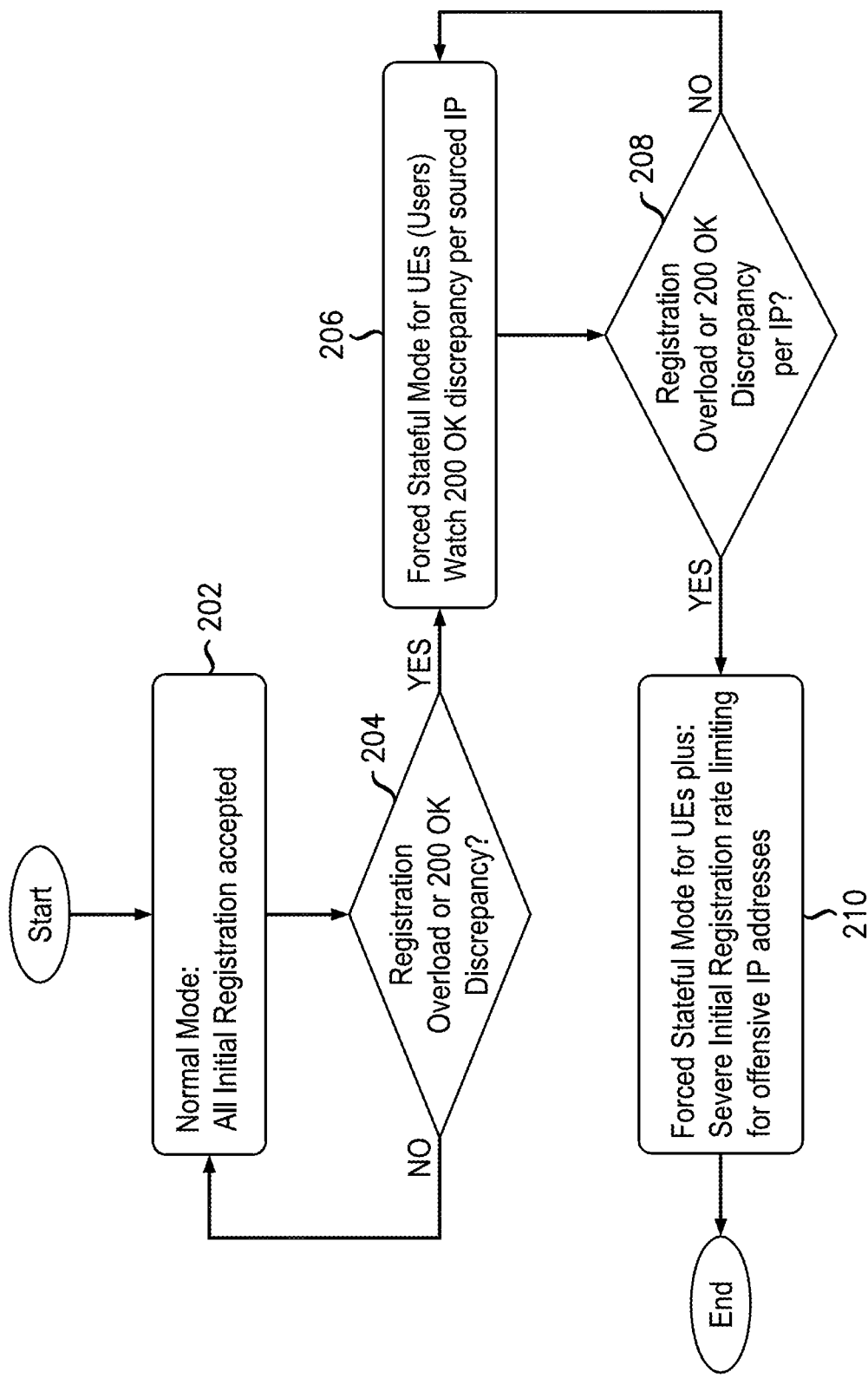
FIG. 2 is a flowchart illustrating a method executed by a SIP firewall to defend against the Initial Registration DDoS attacks in an exemplary embodiment of the invention.

FIG. 2 is a flowchart illustrating a method executed by a SIP firewall to defend against the Initial Registration DDoS attacks. The steps of FIG. 2 will be described with reference to the IMS network 100 in FIG. 1. The steps of the flowchart in FIG. 2 are not all inclusive and may include other steps not shown.

The method begins at step 202, with the SIP firewall operating in a Normal mode in which it accepts all Initial Registrations. Note that under normal conditions, users attempting to register for an IMS session will perform a two-step registration with the protected node (e.g., the P-CSCF): this includes an Initial Registration request, which when passed to the P-CSCF prompts the P-CSCF to issue an authentication challenge to the user equipment (UE). The UE responds with a second registration message including a challenge response which is processed by the P-CSCF to completely authenticate the user; and the P-CSCF will send a "200 OK" message to the UE if the authentication is successful. Note that part of the SIP firewall functionality is to filter out improperly formed or SIP non-compliant messages, thus it is presumed that the registration messages processed by the SIP firewall at step 202 are correctly formatted and SIP compliant messages from which the SIP firewall can not distinguish between good and bad traffic.

At step 204, the SIP firewall monitors registration message traffic relative to one or more thresholds, so as to detect DDoS attacks or suspected DDoS attacks that may be deducted from registration message traffic characteristics. The term "registration message traffic," as used herein, shall be understood to include registration message traffic initiated on either side of the SIP firewall, i.e., including registration requests from the plurality of user devices attempting to gain access to the core network; and registration responses (e.g., without limitation, 200 OK messages initiated by the P-CSCF upon authentication of a user).

In one embodiment, at step 204 the SIP firewall monitors both registration overload (i.e., caused by abnormally high numbers of registration requests) and registration failures relative to appropriate thresholds that may be indicative of DDoS attacks or suspected DDoS attacks. Recall that a successful registration will normally require two register requests from the UE, yielding a single "200 OK" message from the P-CSCF when the registration is successful. Thus, registration failures may be indicated when the number of registration messages are suspiciously higher than the number of "200 OK" messages observed by the SIP firewall, which indicates that there are too many registrations that are not successful. When the discrepancy between registration messages and 200 OK messages is above a threshold, this may be indicative of a DDoS attack or suspected DDoS attack.

If the number of initial registrations does not exceed a first threshold indicative of suspected DDoS attack, and if the discrepancy between registration messages and 200 OK message does not exceed a second threshold indicative of suspected DDoS attack, the SIP firewall continues normal operation at step 202. But if the SIP firewall detects either an usually high number of initial registrations or an unusually high discrepancy between registration messages and 200 OK messages, it is reasonable to suspect that a DDoS attack is in progress and the SIP firewall advances to step 206 to begin to execute a protection strategy against the excessive registrations. It is noted, an initial registration overload might also be caused by a registration "storm" (i.e., a very large number of legitimate users attempting to register simultaneously) which may occur for example at times of network failure or equipment failover. In either case, the SIP firewall presumes that this is an attack and advances to step 206.

At step 206, in accordance with an exemplary embodiment of the invention, the SIP firewall will begin to execute a protection strategy to limit the number of registrations it passes on to the protected node without closing the registration window to legitimate users, by first responding to each initial SIP registration request with a "fake" authentication challenge (appearing to originate from the protected node) and a predictive nonce that is to be used in the challenge response. In one embodiment, the predictive nonce is a pseudo-random string calculated from the SIP message that has short time validity so that it is sufficiently unpredictable to the UE.

Responsive to this fake authentication challenge, the UE must reply with a second registration request including the nonce and the challenge response. In one embodiment, the SIP firewall will confirm an association between the challenge response and the corresponding fake authentication challenge by verifying the nonce (but not the challenge response, since it is a fake request) before opening a registration window to the protected node. In such manner, the SIP firewall forces the UE to be in a "stateful" mode and to use a valid IP address in order to mount a successful attack, which makes an attack extremely difficult and costly.

A stateful mode is a mode whereby the user node must retain state information in order to complete or continue a transaction that it initiates, or that it responds to. In embodiments of the present invention, the SIP firewall is said to force the UE to be stateful because the UE must store intermediate information in order to reply with a second registration request that includes the nonce and the challenge response, and thereby obtain a chance to pass the SIP firewall and access the open registration window. Moreover, the described embodiments force the UE to use a valid IP address because if the UE were to use a spoofed IP address it would not receive the authentication challenge and nonce.

More particularly, one important aspect of the system is that the challenge is encrypted with a redundant verification code: it is predictive. In the challenge response from the UE, the SIP firewall can recognize its challenge if it was generated by itself, but no attacker can generate a "good challenge." The SIP firewall does not need to remember which challenge it returned (it is stateless at this stage), since it can authenticate any of the ones it generated itself. On the other hand, the attacker MUST remember its first registration to respond with a correct challenge (i.e., it must be stateful).

In one embodiment, the opening of the registration window is accomplished (after the nonce is verified) by setting the flow on a "pre-trusted" mode for a short time and valid for two SIP register messages only. The SIP firewall rejects the Initial Registration with a short Retry-After value thereby prompting the UE to retry the Initial Registration; and this subsequent registration (for so long as the UE is "pre-trusted") will be allowed to proceed to the protected node. In one embodiment, before forwarding the subsequent registration to the CSCF, the SIP firewall will remove the Authorization header used by the UE to respond to the "fake" authentication challenge. This will make this (subsequent) registration request look like an initial request to the P-CSCF and the P-CSCF can challenge it "normally" according to the usual two-step SIP registration flow.

The strategy of step 206 insures that the attacker is using a real, non-spoofed IP address, but it is useful to apply yet another protection policy: similarly as accomplished at step 204 in which the SIP firewall monitored for registration overload and registration failures (in that case with register requests coming from anywhere), at step 208 the SIP firewall monitors for registration overload and registration failures on a per source IP address basis.

Recall that registration overload may be detected by comparing the number of initial registrations to a first threshold number and registration failure overload may be detected by monitoring the discrepancy between registration messages and 200 OK messages and comparing to a second threshold. For so long as no overload and no registration failure overload is detected the SIP firewall continues the strategy of step 206. But in case overload is detected or there is a discrepancy between the 200 OK and the registration requests indicative of registration failure overload, the SIP firewall advances to step 208.

At step 208, the SIP firewall will continue in the manner of step 206 to force users to be in a "stateful" mode and to use a valid IP address but will begin to impose severe restrictions on initial registrations from the offending IP addresses only. This is legitimate because the proposed stateful protection algorithm insures that the attacker really owns this IP address. This additional protection also eliminates the risk of having an attacker launch an "initial registration" stateful attack from one or a small number of powerful machines using routable IP addresses. A successful attack must consequently be both stateful and massively distributed from hundreds of thousands of nodes while using real IP addresses, which is believed to be extremely difficult to achieve.

It is noted, in the course of accepting registrations in the "pre-trusted" mode (as well as in the "normal" mode), it is contemplated that at least a portion of the registrations will be successfully confirmed by the IMS core (e.g., the P-CSCF). In such case, the SIP firewall knows that the UE can be trusted and therefore assigns a "trusted" policy to the particular UE.

FIGS. 1-2 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

For example, the described embodiments herein refer to an exemplary SIP firewall architecture for protecting IMS networks against SIP-based attacks, most particularly "Initial Registration" attacks which are particularly troublesome to SIP-based networks. However, it will be appreciated that the present invention is not limited to SIP firewalls, IMS networks or defense against Initial Registration attacks. More generally, the present invention may be implemented in a firewall residing between an access network and any type of generic network medium, to defend against suspiciously high registration message traffic, not limited to SIP-based registration traffic that is directed to a particular network.

The term "registration" as used herein refers generally to the process by which users, operating user equipment (UE), must first register with a network medium prior to establishing some service. Often, this process comprises an authentication of the user. Once registered, the user typically gets full access to the system and may be considered "trusted." The present invention focuses on registration message traffic because the user is generally unknown and untrusted at the registration stage, until such time as they are authenticated. With IMS or other SIP-based networks, registration is a mandatory two-step process (comprising Initial and Subsequent registration requests) and no services are provided until the UE has successfully registered with the core network. As will be appreciated, however, the invention may be implemented in non-SIP-based networks that may differ in protocol, syntax or the like and may characterize fewer or greater registration steps than SIP-based networks.

Moreover, the described embodiments refer to an exemplary process for detecting suspiciously high registration traffic by monitoring both registration overloads and registration failures relative to threshold conditions, and triggering protective measures against DDoS attacks in event of either registration overloads or registration failure overloads. However, it will be appreciated that the present invention may be implemented alternatively by detecting only one of registration overloads and registration failures, or by detecting other alternative characteristics that may represent DDoS attacks or suspected DDoS attacks and to trigger a protective measures accordingly.

As would be readily apparent to one of ordinary skill in the art, the firewall (whether SIP-based or non-SIP based) may be implemented as a processor (or computer or machine containing a processor) executing a computer program code stored in a memory (comprising a computer-, processor- or machine-readable storage medium). Given this disclosure of the invention, one skilled in the art could readily produce appropriate computer program code in order to implement the protocols described herein.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM).

What is claimed is:

1. In a communication network including a firewall residing between an access network and a core network, a method comprising the firewall:

monitoring registration message traffic relative to one or more thresholds, the registration message traffic including registration requests issued from a plurality of user devices attempting to gain access to the core network;

responsive to the registration message traffic exceeding any of the one or more thresholds, challenging a number of the registration requests with fake authentication challenges;

receiving a number of challenge responses responsive to the fake authentication challenges;

confirming an association between the challenge responses and the corresponding fake authentication challenges for one or more of the plurality of user devices; and opening a registration window to the core network from the one or more user devices having a confirmed association between the challenge responses and the corresponding fake authentication challenges such that the core network performs an actual authentication for the one or more user devices; and removing an authorization header used by the one or more user devices to respond to the corresponding fake authentication challenges prior to the core network performing the actual authentication for the one or more user devices.

2. The method of claim 1, wherein the step of monitoring registration message traffic comprises:

monitoring registration requests relative to a first threshold condition; and monitoring registration failures relative to a second threshold condition.

3. The method of claim 1, wherein:

the step of challenging comprises responsive to each registration request, issuing a fake authentication challenge including a predictive nonce value; and the step of confirming an association comprises confirming that the respective challenge responses from the one or more user devices includes the predictive nonce value of the corresponding fake authentication challenge.

4. The method of claim 3, wherein the step of confirming an association verifies a stateful mode and valid IP address of the one or more user devices.

5. The method of claim 4, further comprising:

monitoring registration message traffic on a per-user basis from the one or more user devices having a verified stateful mode and valid IP address;

responsive to registration message traffic from any individual user device of the one or more user devices exceeding a threshold condition, thereby defining an offending user device, restricting further registration messages from the offending user device.

6. The method of claim 5, wherein the step of monitoring registration message traffic on a per-user basis comprises:

monitoring registration requests on a per-user basis; and monitoring registration failures on a per-user basis.

7. The method of claim 1, wherein the step of opening a registration window comprises the firewall performing, for at least one user device, steps of:

prompting the user device to reattempt registration with the core network;

assigning a pre-trusted status to the user device valid for a predetermined number of further registration requests; and for so long as the user device maintains pre-trusted status, passing one or more further registration requests issued from the user to the core network for registration of the user device.

8. An article of manufacture comprising a non-transitory processor-readable storage medium storing one or more software programs which when executed by a processor associated with the firewall perform the steps of the method of claim 1.

9. The method of claim 1, wherein the firewall is a SIP firewall and the core network is an IMS core network, the step of monitoring registration message traffic comprising monitoring SIP registration message traffic.

10. The method of claim 9, wherein the SIP registration message traffic nominally includes first and second SIP registration requests from each of one or more of the plurality of user devices attempting to gain access to the IMS core network,
the step of challenging a number of the registration requests comprising challenging a number of the first SIP registration requests with fake authentication challenges including a predictive nonce value;
the step of receiving a number of challenge responses comprising receiving one or more second SIP registration requests responsive to the fake authentication challenges;
the step of confirming an association comprising confirming that the respective second SIP registration requests from one or more of the plurality of user devices includes the predictive nonce value of the corresponding fake authentication challenges; and
the step of opening a registration window comprising opening a registration window to the one or more user devices having a confirmed association between the second SIP registration request and the corresponding fake authentication challenge.

11. The method of claim 10, wherein the step of confirming an association verifies a stateful mode and valid IP address of the one or more of the plurality of user devices.

12. The method of claim 11, further comprising:
monitoring registration message traffic on a per-user basis from the one or more user devices having a verified stateful mode and valid IP address;
responsive to registration message traffic from any individual user device of the one or more of the plurality of user devices exceeding a threshold condition, thereby defining an offending user device, restricting further registration messages from the offending user device.

13. The method of claim 10, wherein the step of opening a registration window comprises the firewall performing, for at least one user device, steps of:
prompting the user device to reattempt registration with the core network;
assigning a pre-trusted status to the user device valid for two subsequent registration requests; and
for so long as the user device maintains pre-trusted status, passing up to two subsequent registration requests issued from the user to the core network for registration of the user device.

14. Apparatus, comprising:
in a communication network including a firewall residing between an access network and a core network, the firewall comprising:
a memory; and
at least one processor coupled to the memory configured to:
monitor registration message traffic relative to one or more thresholds, the registration message traffic including registration requests issued from a plurality of user devices attempting to gain access to the core network;
responsive to the registration message traffic exceeding any of the one or more thresholds, challenge a number of the registration requests with fake authentication challenges;
receive a number of challenge responses responsive to the fake authentication challenges;
confirm an association between the challenge responses and the corresponding fake authentication challenges for one or more of the plurality of user devices; and
open a registration window to the core network from the one or more user devices having a confirmed association between the challenge responses and the corresponding fake authentication challenges such that the core network performs an actual authentication for the one or more user devices; and
remove an authorization header used by the one or more user devices to respond to the corresponding fake authentication challenges prior to the core network performing the actual authentication for the one or more user devices.

15. The apparatus of claim 14,
wherein coincident to challenging registration requests the processor is configured to issue a fake authentication challenge responsive to each registration request that includes a predictive nonce value; and
wherein coincident to confirming an association the processor is configured to confirm that the respective challenge responses from the one or more user devices includes the predictive nonce value of the corresponding fake authentication challenge.

16. The apparatus of claim 15, wherein the processor is further configured to:
monitor registration message traffic on a per-user basis from the one or more of the plurality of user devices having returned a challenge response including the predictive nonce value of the corresponding fake authentication challenge; and
responsive to registration message traffic from any individual user device of the one or more of the plurality of user devices exceeding a threshold condition, thereby defining an offending user device, restrict further registration messages from the offending user device.

17. The apparatus of claim 14, wherein coincident to opening a registration window to the core network the processor is configured to:
prompt the user device to reattempt registration with the core network;
assign a pre-trusted status to the user device valid for a predetermined number of further registration requests; and
for so long as the user device maintains pre-trusted status, pass one or more further registration requests issued from the user to the core network for registration of the user device.

18. In a communication network including a SIP firewall residing between an access network and an IMS core network, a method comprising the SIP firewall:
monitoring SIP registration message traffic relative to one or more thresholds, the SIP registration message traffic nominally including first and second SIP registration requests from each of one or more user devices attempting to gain access to the IMS core network;
responsive to the SIP registration message traffic exceeding any of the one or more thresholds, challenging a number of the first SIP registration requests with fake authentication challenges;

receiving one or more second SIP registration requests responsive to the fake authentication challenges;

verifying a stateful mode and valid IP address of one or more user devices by confirming an association between the second SIP registration requests and the corresponding fake authentication challenges; and opening a registration window to the core network from the one or more user devices having a verified stateful mode and valid IP address such that the core network performs an actual authentication for the one or more user devices; and removing an authorization header used by the one or more user devices to respond to the corresponding fake authentication challenges prior to the core network performing the actual authentication for the one or more user devices.

19. The method of claim 18, wherein:

the step of challenging comprises responsive to each first SIP registration request, issuing a fake authentication challenge including a predictive nonce value; and the step of confirming an association comprises confirming that the respective second SIP registration requests from the one or more user devices includes the predictive nonce value of the corresponding fake authentication challenge.

20. The method of claim 19, further comprising:

monitoring registration message traffic on a per-user basis from the one or more user devices having a verified stateful mode and valid IP address;

responsive to registration message traffic from any individual user device of the one or more user devices exceeding a threshold condition, thereby defining an offending user device, restricting further registration messages from the offending user device.

21. The method of claim 18, wherein the step of opening a registration window comprises the SIP firewall performing, for at least one user device, steps of:

prompting the user device to reattempt registration with the core network;

assigning a pre-trusted status to the user device valid for a predetermined number of subsequent registration requests; and for so long as the user device maintains pre-trusted status, passing one or more subsequent registration requests issued from the user to the core network for registration of the user device.

\* \* \* \* \*